(12) United States Patent
Ritz (10) Patent No.: US 6,487,785 B1
(45) Date of Patent: Dec. 3, 2002

(54) METHOD AND CIRCUIT FOR ADJUSTING A SWITCHING THRESHOLD OF A TOUCH PROBE

(75) Inventor: Franz Ritz, Übersee (DE)

(73) Assignee: Dr. Johammes Heidenvain GmbH, Traunreut (DE)

( * ) Notice: Subject to any disclaimer, the term of this patent is extended or adjusted under 35 U.S.C. 154(b) by 144 days.

(21) Appl. No.: 09/596,030

(22) Filed: Jun. 15, 2000

(30) Foreign Application Priority Data

Jun. 18, 1999 (DE) .......................................... 199 29 557

(51) Int. Cl.⁷ .............................. G01B 5/03; G01B 7/03
(52) U.S. Cl. ....................................................... 33/561
(58) Field of Search .......................... 33/502, 556, 558, 33/559, 561

(56) References Cited

U.S. PATENT DOCUMENTS

| | | | |
|---|---|---|---|
| 4,263,803 A | * | 4/1981 | Burkhardt ..................... 33/502 |
| 4,527,056 A | | 7/1985 | Burkhardt et al. |
| 4,530,159 A | | 7/1985 | Ernst |
| 4,530,160 A | | 7/1985 | Feichtinger |
| 4,532,713 A | | 8/1985 | Feichtinger |
| 4,547,772 A | | 10/1985 | Ernst |
| 4,549,356 A | | 10/1985 | Ernst |
| 4,581,826 A | | 4/1986 | Ernst |
| 4,603,487 A | * | 8/1986 | Matsunata ..................... 33/556 |
| 4,769,919 A | * | 9/1988 | Lloyd et al. ................... 33/558 |
| 4,819,195 A | * | 4/1989 | Bell et al. ...................... 33/556 |
| 4,854,050 A | * | 8/1989 | McMurtry ..................... 33/503 |
| 4,882,848 A | * | 11/1989 | Breyer et al. ................. 33/559 |
| 5,003,484 A | | 3/1991 | Vollmayr |
| 5,208,993 A | * | 5/1993 | Harding ........................ 33/558 |
| 5,272,817 A | | 12/1993 | Gonzalez |
| 5,321,895 A | * | 6/1994 | Dubois-Dunilac et al. .... 33/556 |
| 5,509,211 A | * | 4/1996 | Ernst ............................ 33/558 |
| 5,526,576 A | | 6/1996 | Fuchs et al. |
| 5,548,902 A | * | 8/1996 | Ernst ............................ 33/561 |
| 5,806,201 A | * | 9/1998 | Feichtinger ................... 33/556 |
| 5,862,604 A | | 1/1999 | Fuchs et al. |
| RE37,030 E | * | 1/2001 | Lloyd et al. .................. 33/559 |

FOREIGN PATENT DOCUMENTS

| | | |
|---|---|---|
| DE | 43 30 873 | 3/1995 |
| DE | 195 25 592 | 1/1999 |
| EP | 0 501 680 | 9/1992 |

\* cited by examiner

Primary Examiner—G. Bradley Bennett
(74) Attorney, Agent, or Firm—Brinks Hofer Gilson & Lione (57) ABSTRACT

A circuit for adjusting a switching threshold of a touch probe, which has a touch element that can be deflected out of a position of repose and which upon a deflection of the touch element out of its position of repose causes a defined change in a measurable system parameter and outputs a switching signal when the value of the system parameter exceeds the switching threshold. The circuit includes a device for measuring the measurable system parameter, an electrical circuit for ascertaining a reference value from which the switching threshold is determinable and an incremental corrector that changes the value of the measurable reference value to the value of the measurable system parameter at the position of repose of the touch element, in which the switching threshold is determinable from the reference value.

32 Claims, 3 Drawing Sheets

METHOD AND CIRCUIT FOR ADJUSTING A SWITCHING THRESHOLD OF A TOUCH PROBE

Applicant claims, under 35 U.S.C. §119, the benefit of priority of the filing date of Jun. 18, 1999 of a German patent application, copy attached, Serial Number 199 29 557.3, filed on the aforementioned date, the entire contents of which is incorporated herein by reference.

BACKGROUND OF THE INVENTION

1. Field of the Invention

The invention relates to a method and a circuit for adjusting a switching threshold of a touch probe.

2. Discussion of Related Art

From European Patent Disclosure EP 0 501 680 B1, a circuit for a touch probe (touch system) with a deflectable touch element is known that upon a deflection of the touch element out of its position of repose outputs a switching signal. Such touch probes are used for determining the position of workpieces that are chucked in machines, especially milling machines, that machine material.

The term position of repose of the touch element is understood to mean a position of the touch element in which it as yet has no contact with a workpiece. Only upon contact of the touch element with the workpiece is the touch element moved out of its position of repose.

To ascertain whether the touch element has been deflected out of its position of repose, a voltage is measured, which drops across contacts disposed in the touch probe. Upon deflection of the touch element out of its position of repose, the touch probe causes a change in the voltage dropping across the contacts. If the voltage exceeds a predetermined switching threshold, the touch probe outputs a switching signal.

A known touch probe also readjusts the switching threshold after a deflection of the touch element and its return to its position of repose. This readjustment is necessary because, as a result of material wear and the effect of moisture and temperature, the touch element after a deflection out of its position of repose does not always return to the position of repose it originally occupied; instead, it assumes a position that deviates slightly from the originally assumed position of repose, or in other words it assumes a new position of repose. If the switching threshold were not readjusted, the circuit would always generate a switching signal even though the touch element no longer has any contact with the workpiece. Thus, upon assumption of the new position of repose, the switching threshold is adjusted to a value that corresponds to the resistance or voltage dropping across the contacts at the new position of repose of the touch element.

However, it is a disadvantage of the known touch probe that a deflection of the touch element that occurs during the adjustment of the switching threshold is not detectable, since the adjustment of the switching threshold from one value to another is caused by the adoption of an instantaneous value. Slight variations in the measured voltage, which are caused by a slight deflection of the touch element, can therefore not be detected by the known touch probe during a simultaneous adjustment of the switching threshold. At the same time, vibration of the machine in which the touch probe is used can affect the known touch probe, causing an incorrect adjustment of the switching threshold and failing to assure proper function of the touch probe.

OBJECT AND SUMMARY OF THE INVENTION

It is therefore an object of the present invention to disclose a method and a circuit that assure a more accurate, malfunction-free adjustment of the switching threshold of a touch probe (touch system).

The above object is attained according to one aspect of the present invention that regards a method for adjusting a switching threshold of a touch probe, which has a touch element. The method includes deflecting the touch element out of a position of repose and causing a defined change in a measurable system parameter based on the deflecting of the touch element. Adjusting a switching threshold to a value dependent on the value of the measurable system parameter at the position of repose of the touch element, wherein the switching threshold is determined from a reference value, which is variable in increments and which is compared with the value of the measurable system parameter at the position of repose of the touch element and the reference value is corrected by one increment at a time, based on the value of the measurable system parameter at the position of repose of the touch element, if the reference value deviates from the value of the measurable system parameter at the position of repose of the touch element.

The above object is also attained by a second aspect of the present invention that regards a circuit for adjusting a switching threshold of a touch probe, which has a touch element that can be deflected out of a position of repose and which upon a deflection of the touch element out of its position of repose causes a defined change in a measurable system parameter and outputs a switching signal when the value of the system parameter exceeds the switching threshold. The circuit includes a device for measuring the measurable system parameter, an electrical circuit for ascertaining a reference value from which the switching threshold is determinable and an incremental corrector that changes the value of the measurable reference value to the value of the measurable system parameter at the position of repose of the touch element, in which the switching threshold is determinable from the reference value.

Accordingly, in an embodiment of a method according to the present invention for adjusting a switching threshold of a touch probe, which has a touch element that can be deflected out of its position of repose and which upon a deflection of the touch element out of its position of repose effects a defined change in a measurable system parameter and outputs a switching signal if the system parameter exceeds the switching threshold, the switching threshold is determined from an incrementally variable reference value. This reference value is compared at predeterminable times with the value of the system parameter in the position of repose of the touch element and is corrected by one increment at a time on a basis of this value of the system parameter, if the reference value deviates from this value of the system parameter.

The term "incrementally variable value" is understood to mean a value that can never be increased or decreased by more than a predeterminable value, namely one increment. In particular, the incrementally variable reference value is formed by a digital signal.

The term "touch probe" is understood to mean a touch system which as its essential components has both a touch element and a generator for generating a switching signal.

In an embodiment of a method according to the present invention, the adjustment of the switching threshold accordingly is accomplished by incremental, repeated slight approximation of the reference value to a value that is dependent on the value of the system parameter in the position of repose of the touch element. The invention has the advantage that on the one hand it assures precise adjustment of the switching threshold at any time. Secondly, it assures that as a rule even during the adjustment operation, a simultaneous deflection of the touch element is detectable.

In a first variant of an embodiment of a method according to the present invention, the reference value is corrected upon assumption of operation of the touch probe, that is, when the touch probe is switched on or a supply voltage is applied to the touch probe, only until such time as the reference value attains or exceeds the value of the system parameter in the position of repose of the touch element. Next, the touch probe is determined from the reference value. To that end, it is preferably provided that the reference value, upon attaining or exceeding the value of the system parameter in the position of repose of the touch element, is increased by a predeterminable value. The touch probe is then adjusted to this increased reference value.

The predeterminable, preferably constant value by which the reference value is increased is selected to be so slight that the switching threshold, set to the increased reference value, deviates only slightly from the value of the system parameter in the position of repose of the touch element. This increases the accuracy of the touch probe, so that even an only slight deflection of the touch element is detectable.

In a further version of an embodiment of a method according to the present invention, it is provided that the switching threshold is repeatedly readjusted as long as the touch probe is in operation. Thus, shifts in the position of repose of the touch element caused by wear, temperature and moisture during the entire duration of operation of the touch probe are compensated for, and proper functioning of the touch probe at all time is assured. The switching threshold is corrected on the basis of the value of the system parameter in the position of repose of the touch element in such a way that the switching threshold deviates only slightly from the value of the system parameter in the position of repose of the touch element. The switching threshold is always, however, adjusted in such a way that the proper function of the touch probe is assured.

An already-adjusted switching threshold is preferably always adjusted to a new value if the already-adjusted switching threshold deviates by a predeterminable amount from the value of the system parameter in the position of repose of the touch element. The predeterminable amount is preferably determined by the interval that must be present between the switching threshold and the value of the system parameter in the position of repose of the touch element if reliable functioning of the touch probe is to be assured.

The switching threshold, or the reference value determining the switching threshold, is always varied only slightly here, so that normally a deflection of the touch element out of its position of repose during the adjustment or readjustment of the switching threshold is detectable. The reason for this is that normally in a touch-sensing operation the value of the system parameter changes faster than the incremental correction of the switching threshold according to the invention.

Preferably, the readjustment of the switching threshold is never performed until the touch element, after a deflection, has returned to its position of repose. A return of the touch element to its position of repose is preferably assumed whenever the touch probe has not been moved further within a predeterminable period of time, such as one minute. As an alternative, the return of the touch element to its position of repose can be detected by suitable sensors. In this alternative version, the readjustment of the switching threshold for instance occurs only after a predetermined period of time after the detection of the return of the touch element to the position of repose by the sensors.

As the system parameter, a voltage that drops over a detector system is preferably measured; its magnitude is a measure for the motion of the touch element out of its position of repose. In the event that the voltage measured by the detector system exceeds the switching threshold because of a motion of the touch element out of its position of repose, a switching signal is generated by the touch probe.

In a further version of an embodiment of a method according to the present invention, a further signal is generated by the touch probe in the event that upon the adjustment of the switching threshold, a predeterminable limit value of the switching threshold is exceeded. The touch probe is then switched off immediately, or else an alarm signal is output to the evaluation unit. It is advantageous that a readjustment takes place only within a predetermined adjustment range, which for instance is defined by the allowable operating conditions of components employed.

A circuit is suitable for performing the above-described method. With regard to the advantages of the circuit of the invention, reference is made to the remarks made above. According to an embodiment of the present invention, the circuit has a device for measuring a system parameter in the position of repose of the touch element. Furthermore, an electric (for instance digital) circuit is provided for ascertaining a reference value from which the switching threshold can be determined. The circuit also incrementally corrects the reference value to the value of the system parameter in the position of repose of the touch element. The switching threshold is determined from the corrected reference value.

Further advantages, as well as details of the optical position measuring system in accordance with the invention ensue from the subsequent description of several exemplary embodiments by means of the attached drawings.

DETAILED DESCRIPTION OF THE PREFERRED EMBODIMENTS

Figure 1:
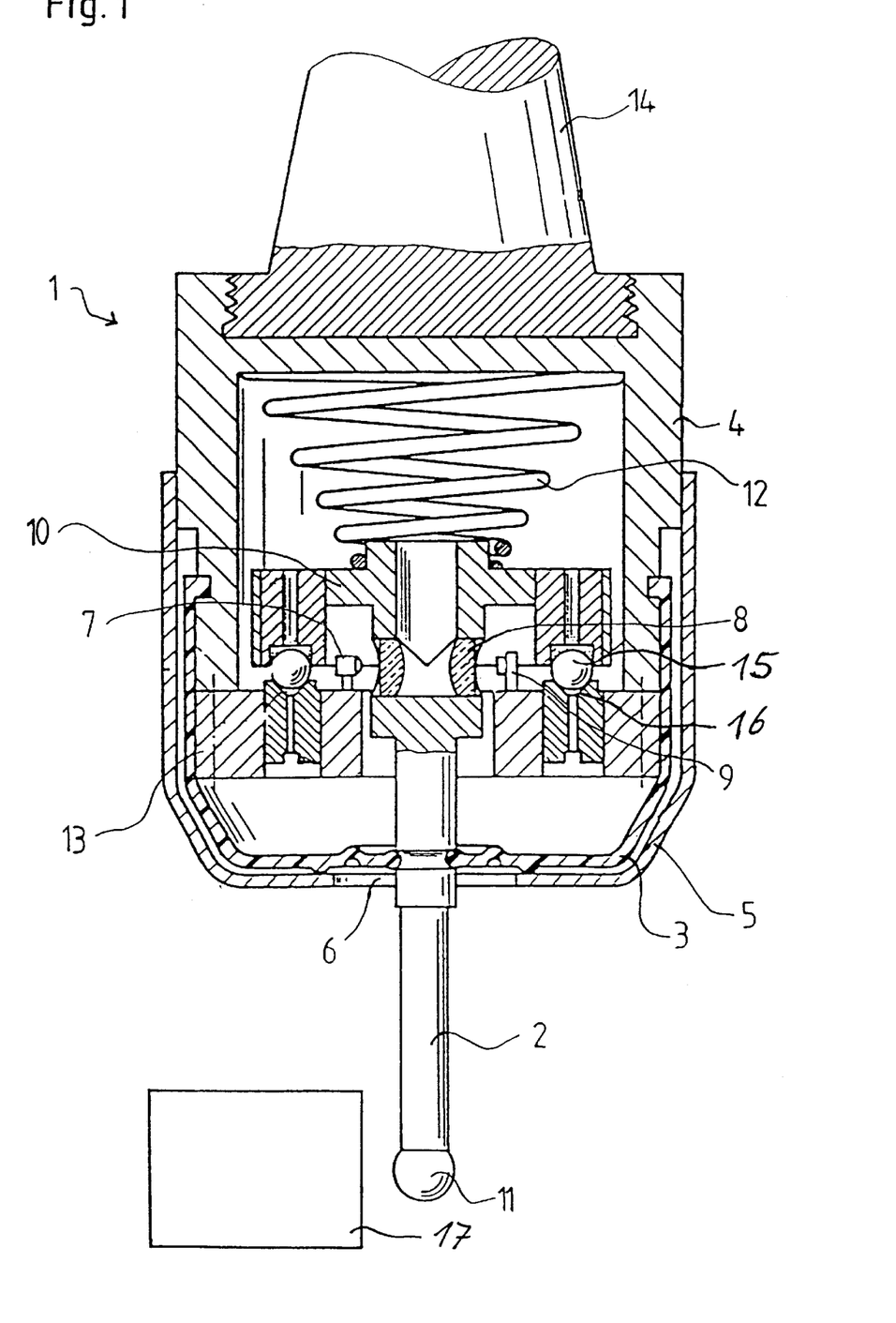
FIG. 1 is a longitudinal cross-sectional view of an embodiment of a touch probe according to the present invention for determining the position of a workpiece.

FIG. 1 shows a touch probe 1, which is used to determine the position of a workpiece 17 chucked in a machine, such as workpiece 17 chucked in a milling machine. The touch probe 1 is inserted by a cone 14 into a spindle of the machine. To assure a firm connection of the touch probe 1 to the spindle, the cone 14 is solidly disposed on a housing 4 of the touch probe 1.

On the end of the housing 4 of the touch probe 1 opposite the cone 14, the touch probe 1 has a touch element in the form of a touch pin 2 with a feeler ball 11, which is supported such that it is movable in multiple directions in the housing 4. The space between the housing 4 of the touch probe 1 and touch pin 2 is closed with a seal 3. A sheet-metal guard 5 is also disposed around the touch pin 2 and is intended to prevent damage to the seal 3 from chips that occur in the machining of the workpiece 17. In the immediate vicinity of the touch pin 2, the sheet-metal guard 5 has an opening 6, which assures a deflection of the touch pin 2 out of its position of repose. The position of repose of the touch pin 2 is as a rule located on the axis of symmetry of the touch probe 1, as shown in FIG. 1.

The touch pin 2 is solidly connected to a touch holder 10. One end of a compression spring 12 is disposed on the touch holder 10, and this spring rests with its other end on the housing 4 of the touch probe 1. A support structure for supporting the touch holder 10 on the bottom 13 of the housing 4 of the touch probe 1 is also provided. As a rule, this support structure includes a plurality of balls 15, which are braced in V-shaped grooves 16 or prisms and which assure a replicable support of the touch pin 2 on the housing bottom 13. A support structure with three balls offset by 120° from one another, which form a three-point bearing, is especially advantageous.

Upon contact of the feeler ball 11 of the touch pin 2 with the workpiece 17 chucked in the machine, the touch pin 2 is deflected out of its position of repose. This deflection is detected by a detector system 7–9. To that end, the detector system has a fixed optical transmitter 7, embodied as an LED, as well as an also-fixed differential photo-element 9, oriented with the transmitter, on the housing bottom 13. A lens system 8 is disposed in stationary fashion on the movable touch pin 2 in the optical axis of both the optical transmitter 7 and the differential photo-element 9. The detector system 7–9 thus forms a light gate system.

Upon the deflection of the touch pin 2, a change occurs in the intensity of the light from the optical transmitter 7 that strikes the differential photo-element 9, and thus a change in an output voltage of the differential photo-element 9 occurs. The change in the output voltage of the differential photo-element 9 is a measure for the deflection of the touch pin 2, so that a contact of the touch pin 2 with the workpiece 17 is detectable.

More precisely, a deflection of the touch pin 2 causes a change in the output current of the differential photo-element 9, on the basis of such change, by a suitable amplifier, a measurable change in a corresponding voltage is generated. In other words, the change in the output voltage is a reflection of the change in the output current and thus also in the light intensity at the differential photo-element 9. For short, this will here be called a change in the output voltage of the differential photo-element 9 caused by a deflection of the touch pin 2.

Instead of the optical detector system described above, it is also possible in conjunction with the present invention to use other detectors, based for instance on magnetic, inductive or capacitive principles. This is because the invention pertains to the adjustment of the switching threshold of the touch probe 1 and is therefore independent of the type of detector used.

Figure 2:
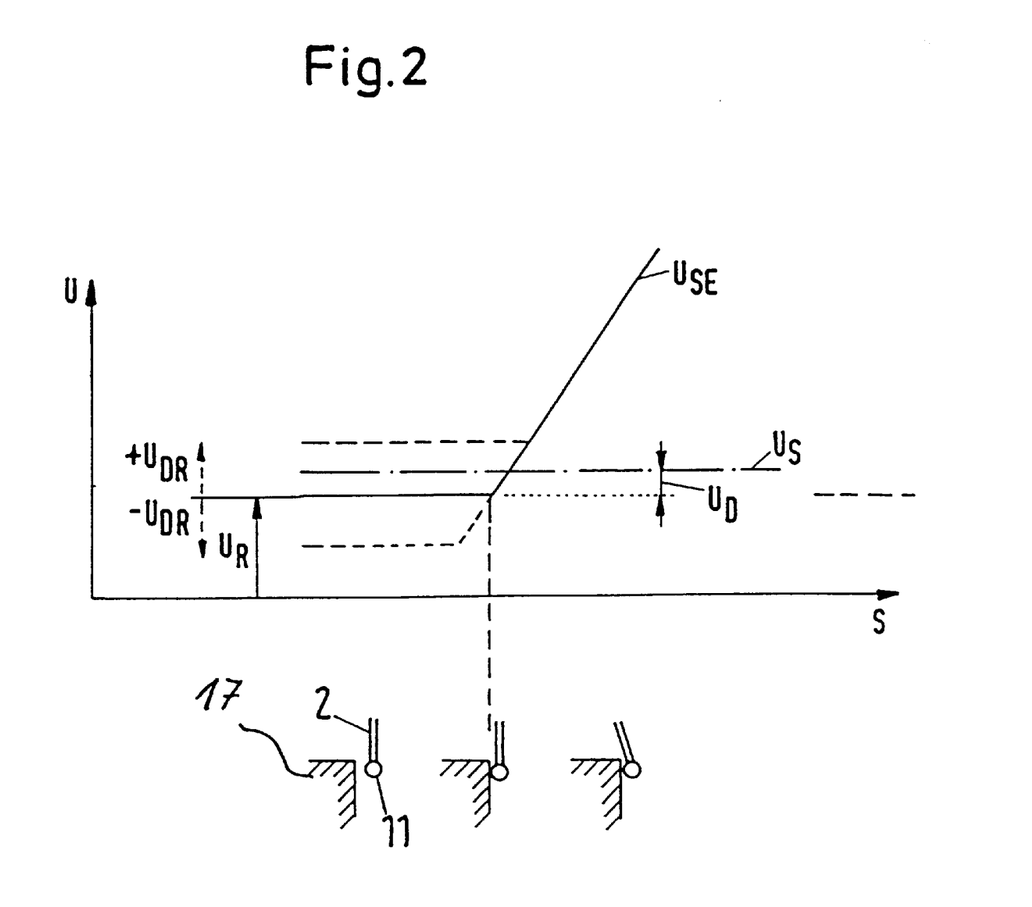
FIG. 2 is a graph of the shape of the voltage upon the approach of a touch element of touch probe of FIG. 1 to the workpiece.

The output voltage and the touch-sensing operation are shown in FIG. 2. As long as the touch pin 2 does not touch the workpiece 17 in the touch-sensing operation and is not deflected out of its position of repose, the output voltage U of the differential photo-element 9 is as a rule constant and corresponds to a voltage $U_R$, which will hereinafter be called the resting voltage $U_R$. Only upon deflection of the touch pin 2, caused by the contact of the feeler ball 11 of the touch pin 2 with the workpiece 17, does the voltage $U_{SE}$ rise.

If a switching threshold $U_S$ is exceeded, a switching signal is generated by the touch probe 1; this signal carried on to an evaluation unit, not shown in further detail here. The switching threshold $U_S$ is selected such that it has a value higher, by the amount $U_D$, than the resting voltage $U_R$. The interval amount $U_D$ certainly does not have to be a constant. All that is essential is that $U_D$ be selected such that the switching threshold $U_S$ is above the resting voltage $U_R$, that is, the output voltage $U_{SE}$ of the differential photo-element 9 in the position of repose of the touch pin 2, so as to assure the proper function of the touch probe 1.

The resting voltage $U_R$ shown in FIG. 2 is not always constant. It is subject to drifting—when viewed over a relatively long period of time. The cause of this drift is that the touch pin 2, after a deflection, does not always return to its original position of repose but instead can assume a position deviating from it, that is, a new position of repose. This is dictated not only by mechanical wear of the touch probe 1 but also by the effect of moisture and temperature on the touch probe 1. As a result, in the position of repose of the touch pin 2, a change in the relative position of the optical sensor 7, the lens system 8 and the differential photo-element 9 to one another occurs, which leads to a change and thus drift in the resting voltage $U_R$.

As a result of the drift, the resting voltage $U_R$ can for instance decrease by an amount $U_{DR}$ ($-U_{DR}$), so that the interval between the resting voltage $U_R$ present in the position of repose of the touch pin 2 and the adjusted switching threshold $U_S$ becomes greater. However, the result of this is a decrease in the precision of the touch probe 1.

However, it is also possible that the resting voltage $U_R$ can increase by the amount $U_{DR}$ because of drift ($+U_{DR}$), in particular by an amount at which the switching threshold $U_S$ is exceeded, so that proper function of the touch probe 1 is no longer assured.

Due to the circuit of the invention, described below, of the touch probe 1 with respect to which the method of the invention is explained in further detail, the switching threshold $U_S$ is adjusted as a function of this possible drift in such a way that reliable, proper function of the touch probe 1 at all times is assured.

Figure 3:
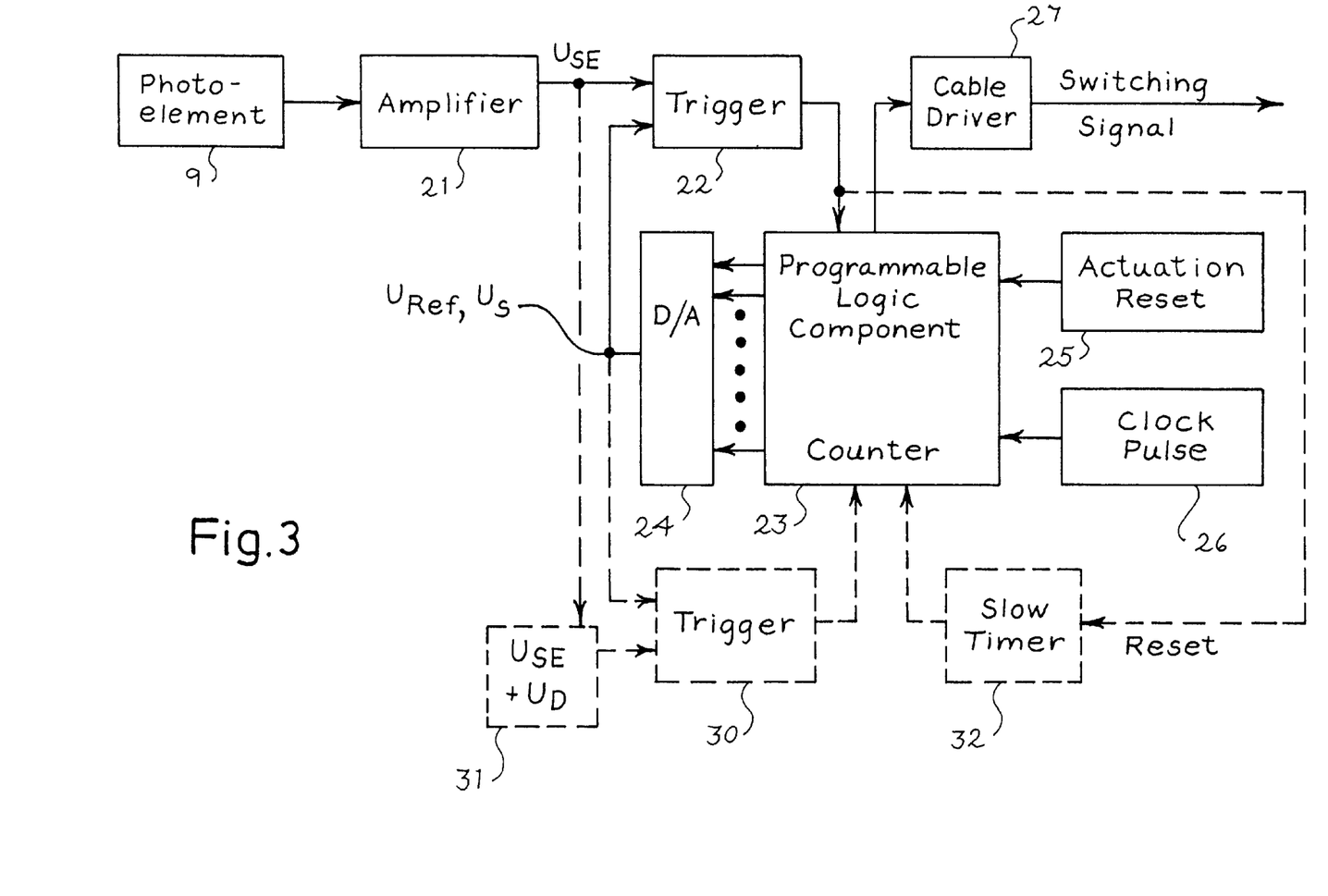
FIG. 3 is a block circuit diagram of an embodiment of a circuit according to the present invention.

FIG. 3, in a block circuit diagram, shows an embodiment of a circuit according to the present invention, which is disposed in the touch probe 1. As an alternative, it is also possible for the circuit to be disposed in part or completely outside the touch probe 1. In this alternative exemplary embodiment, not shown, the output voltage $U_{SE}$ of the differential photo-element 9 is carried to the circuit over suitable lines.

The circuit disposed in the touch probe 1 has an amplifier 21, which is connected to the differential photo-element 9. From the output current of the differential photo-element 9, the amplifier 21 generates an adequately amplified measurable system parameter such as output voltage $U_{SE}$ and sends as an input signal to a trigger 22, which is connected to the amplifier 21. As long as the touch pin 2 is in its position of repose, or in other words has not yet been deflected, the output voltage $U_{SE}$ corresponds to the resting voltage $U_R$, as shown in FIG. 2.

As a further input signal, the trigger 22 receives a reference voltage $U_{Ref}$, which is furnished by a programmable logic component 23. To that end, a digital counter is disposed in the logic component 23, and upon turning on the touch probe 1 or application of a supply voltage to the touch probe 1, the digital counter receives a reset signal from an actuation reset 25. As a function of a clock pulse 26, the digital counter in the logic component 23 is increased in steps, and the counter state of the digital counter is sent to a digital/analog converter 24, downstream of the logic component 23, that converts the counter state into the analog reference voltage $U_{Ref}$, which is supplied as a switching threshold $U_S$ to the input of the trigger 22.

After each increase in the reference voltage $U_{Ref}$, the reference voltage $U_{Ref}$ in the trigger 22 is compared with the resting voltage $U_R$, which is present as the output voltage $U_{SE}$ at the output of the differential photo-element 9, if the touch pin 2 is in its position of repose. If in this comparison it is found that the reference voltage $U_{Ref}$ is lower than the resting voltage $U_R$, then the trigger 22 does not switch through; instead, the counter state of the digital counter of the logic component 23 is increased by a further counting increment upon the clock pulse 26. The increased counter state is then again converted by the digital/analog converter 24 into a reference voltage $U_{Ref}$. In other words, the reference voltage $U_{Ref}$ is increased in stages and corrected on the basis of the position of repose $U_R$.

In general, the stages on which the stepwise increase in the reference voltage is based can each be defined by a predeterminable number of clock pulses of a clock generator. For the sake of simplicity, it has been assumed here that one stage corresponds to each clock pulse, but this is not compulsory.

The increase in the reference value $U_{Ref}$ occurs until the reference value $U_{Ref}$ attains or exceeds the resting voltage $U_R$. In that case, the trigger 22 sends an output signal to its signal output and on to the logic component 23, whose digital counter thereupon increases its counter state further by a predetermined number of clock pulses. This predetermined number of clock pulses corresponds to a predeterminable and constant increase in the value of the reference value $U_{Ref}$. After this increase by a predetermined clock pulse interval, the voltage $U_{Ref}$, which is proportional to the counter state of the digital counter, is the switching threshold $U_S$ that is present at the input of the trigger 22. Thus in this state, the reference voltage $U_{Ref}$ present at the input of the trigger 22 corresponds to the switching threshold $U_S$. After the adjustment of the voltage $U_S$, a signal is also output by the logic component 23 to a cable driver 27 (interface with the evaluation unit) that is downstream of the logic component 23; with this signal, the operational readiness of the touch probe 1 is indicated to the evaluation unit, not shown.

Due to the circuit and the method described here, it is possible for the switching threshold $U_S$ to be determined and adjusted precisely upon turning on the touch probe 1. In this adjustment, influences resulting from mechanical wear and aging of the touch probe 1 as well as the influence of moisture and temperature on the touch probe 1 are taken into account, so that proper function of the touch probe 1 is always assured.

A deflection of the touch pin 2 is detected as follows: The output voltage $U_{SE}$ of the differential photo-element 9 is measured constantly and fed to the input of the trigger 22. In the trigger 22, the output voltage $U_{SE}$ is compared with the switching threshold $U_S$, which is likewise fed to the trigger 22. Upon a deflection, the measured output voltage $U_{SE}$ of the differential photo-element 9 exceeds the switching threshold $U_S$, so that the trigger 22 switches through. The logic component 23 then outputs a switching signal to the evaluation unit, not shown, via the cable driver 27.

The circuit described can also be provided for the sake of repeatedly readjusting the previously adjusted switching threshold $U_S$ during ongoing operation of the touch probe 1. The reason this is necessary is that over relatively long operation, the position of repose of the touch pin can shift for the reasons given above, which causes a drift in the resting voltage $U_R$. The provisions additionally required because of this are shown in dashed lines in FIG. 3.

In this exemplary embodiment, the readjustment of the switching threshold $U_S$ is always performed after the deflection of the touch pin 2 and returned to its position of repose, that is, to the position in which the touch pin 2 no longer has any contact with the workpiece 17. In the exemplary embodiment shown in FIG. 3, a return of the touch pin 2 to its position of repose is assumed whenever no further deflection of the touch pin 2 has been detected within a period of one minute.

After the return of the touch pin 2 to its position of repose, the counter state of the digital counter of the logic component 23 is increased or decreased by one counting step in slow cycles of at least one minute. The slow cycles are made available by a slow timer 32, which precedes the logic component 23. The slow timing cycle can also be derived from the faster clock pulse of the clock generator 26 by frequency division.

The direction of the counting step is determined by a further trigger 30, which precedes the logic component 23 and whose first input is connected to the output of the digital/analog converter 24 and whose second input is connected to the output of an adder 31. The output of the trigger 30 is again connected to the logic component 23.

The output signal of the adder 31 corresponds to the sum of a currently measured voltage $U_{SE}$, which is present as the output voltage of the differential photo-element 9 after the return of the touch pin 2 to its position of repose, and a predetermined, preferably memorized voltage value $U_D$ which reflects the minimum interval of the switching threshold $U_S$ from the resting voltage $U_R$ in the position of repose of the touch pin 2. This minimum interval $U_D$ is necessary to assure proper function of the touch probe 1, as has already been explained in conjunction with FIG. 2.

The output signal of the adder 31 is compared in the trigger 30 with the output signal of the digital/analog converter 24, that is, the switching threshold $U_S$ already determined on the basis of the reference value $U_{Ref}$.

If the output signal of the adder 31 proves to be higher than the adjusted switching threshold $U_S$, then the resting voltage $U_R$ has drifted upward. The counter state of the digital counter of the logic component 23 is then increased by counting step. However, if the output signal of the adder 31 proves to be less than the switching threshold $U_S$, then the resting voltage $U_R$ has drifted downward. Then the counter state is reduced by one counting step. The trigger 30 accordingly indicates the requisite counting direction of the counter in the logic component 23 so that the clock pulses of the clock generator 32 will be counted with the correct sign, so that the drift is counteracted.

The voltage output by the digital/analog converter 24 after the increase or decrease in the counter state, which voltage reflects the counter state of the digital counter of the logic component 23, is fed as a new switching threshold $U_S$ to the input of the trigger 22 and used to determine any deflection of the touch pin 2 out of its position of repose.

The embodiment of the present invention described here assures that even if the resting voltage $U_R$ drifts, the switching threshold $U_S$ is always adjusted such that proper function of the touch probe 1 at any time is assured. It is also advantageous that the changes in the switching threshold $U_S$ during operation of the touch probe 1 occur only in slight, predeterminable stages or increments, so that even during the adjustment of a new switching threshold, any simultaneous deflection of the touch pin 2 out of its position of repose is detectable. As a result of the two parameters, that is, the clock frequency of the clock generator 32 and the amount of change of the voltage $U_{Ref}$ per clock pulse, the change in the switching threshold $U_S$ takes place so slowly that as a rule a deflection of the touch pin 2 always remains detectable.

It is advantageous that the touch probe 1 is turned off or an alarm signal is supplied to the evaluation unit if the switching threshold $U_S$ exceeds predetermined limit values. The alarm signal is an indication that excessive drifting and hence shifting of the components 15, 16, 7, 8, 9 has occurred.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method for adjusting a switching threshold of a touch probe, which has a touch element, comprising:
deflecting said touch element out of a position of repose;
based on said deflecting of said touch element, causing a defined change in a measurable system parameter;
adjusting a switching threshold to a value dependent on the value of said measurable system parameter at said position of repose of said touch element, wherein said switching threshold is determined from a reference value, which is variable in increments and which is compared with the value of said measurable system parameter at said position of repose of said touch element and said reference value is corrected by one increment at a time, based on the value of said measurable system parameter at said position of repose of said touch element, if the reference value deviates from the value of said measurable system parameter at said position of repose of said touch element.

2. The method of claim 1, comprising:
turning said touch probe on; and
correcting said reference value incrementally until such time as said reference value has attained the value of said measurable system parameter at said position of repose of said touch element.

3. The method of claim 2, wherein upon said reference value reaching or exceeding the value of said measuring system parameter at said position of repose of said touch element, said reference value is increased by a predeterminable value to an increased reference value and said switching threshold is adjusted to the increased reference value.

4. The method of claim 3, wherein said predeterminable value is a constant.

5. The method of claim 1, comprising:
adjusting said adjusted switching threshold, if it deviates by a predeterminable amount from the value of said measurable system parameter at said position of repose of said touch element.

6. The method of claim 1, wherein said reference value that determines said switching threshold is varied slightly and slowly in increments in such a way that a deflection of said touch element from its position of repose during said adjusting of said switching threshold is detectable.

7. The method of claim 5, wherein said reference value that determines said switching threshold is varied slightly and slowly in increments in such a way that a deflection of said touch element from its position of repose during said adjusting of said switching threshold is detectable.

8. The method of claim 1, wherein said adjusting of said switching threshold is performed whenever said touch element has not been deflected out of its position of repose within a predeterminable period of time.

9. The method of claim 5, wherein said adjusting of said adjusted switching threshold is performed whenever said touch element has not been deflected out of its position of repose within a predeterminable period of time.

10. The method of claim 1, wherein said measurable system parameter is a change in voltage as measured by a detector system of said touch probe.

11. The method of claim 1, further comprising:
turning off said touch probe if, during said adjusting said switching threshold, a predeterminable limit value is exceeded.

12. The method of claim 1, further comprising:
generating a warning signal if, during said adjusting said switching threshold, a predeterminable limit value is exceeded.

13. A circuit for adjusting a switching threshold of a touch probe, which has a touch element that can be deflected out of a position of repose and which upon a deflection of the touch element out of its position of repose causes a defined change in a measurable system parameter and outputs a switching signal when the value of the system parameter exceeds the switching threshold, said circuit comprising:
a device for measuring the measurable system parameter;
an electrical circuit for ascertaining a reference value from which the switching threshold is determinable; and
an incremental corrector that changes the value of said measurable reference value to the value of said measurable system parameter at said position of repose of said touch element, in which said switching threshold is determinable from said reference value.

14. The circuit of claim 13, wherein said device for measuring said system parameter comprises a photoelement 9 is carried to the circuit over suitable lines.

15. The circuit of claim 13, further comprising a trigger that is electrically connected to said device for measuring said system parameter and said electrical circuit, wherein said trigger receives a reference voltage from said electrical circuit and a measurable system parameter from said device.

16. The circuit of claim 13, wherein said incremental corrector comprises a counter.

17. The circuit of claim 15, wherein said reference voltage received by said trigger is a switching threshold, wherein said trigger determines whether or not said switching threshold is greater than said measurable system parameter.

18. The circuit of claim 16, wherein said counter adds and subtracts incremental counts.

19. The circuit of claim 15, further comprising:
a second trigger electrically connected to said incremental corrector; and
an adder that is electrically connected to said second trigger and said device for measuring said system parameter, wherein said adder generates a signal corresponding to the sum of said system parameter and a voltage value which reflects the minimum interval of the switching threshold from a resting voltage at the position of repose of said touch pin.

20. The circuit of claim 19, wherein said incremental corrector comprises a counter that adds and subtracts incremental counts, wherein a signal generated by said second trigger determines whether said counter adds or subtracts.

21. A touch probe system comprising:
   a touch probe comprising a touch element that can be deflected out of a position of repose;
   a device for measuring a defined change in a measurable system parameter based on deflection of said touch element out of its position of repose, said device outputting a switching signal when the value of said system parameter exceeds a switching threshold;
   an electrical circuit for ascertaining a reference value from which the switching threshold is determinable; and
   an incremental corrector that changes the value of said measurable reference value to the value of said measurable system parameter at said position of repose of said touch element, in which said switching threshold is determinable from said reference value.

22. The touch probe system of claim 21, wherein said device for measuring said system parameter comprises a photo-element 9 is carried to the circuit over suitable lines.

23. The touch probe system of claim 21, further comprising a trigger that is electrically connected to said device for measuring said system parameter and said electrical circuit, wherein said trigger receives a reference voltage from said electrical circuit and a measurable system parameter from said device.

24. The touch probe system of claim 21, wherein said incremental corrector comprises a counter.

25. The touch probe system of claim 23, wherein said reference voltage received by said trigger is a switching threshold, wherein said trigger determines whether or not said switching threshold is greater than said measurable system parameter.

26. The touch probe system of claim 24, wherein said counter adds and subtracts incremental counts.

27. The touch probe system of claim 23, further comprising:
   a second trigger electrically connected to said incremental corrector; and
   an adder that is electrically connected to said second trigger and said device for measuring said system parameter, wherein said adder generates a signal corresponding to the sum of said system parameter and a voltage value which reflects the minimum interval of the switching threshold from a resting voltage at the position of repose of said touch pin.

28. The touch probe system of claim 27, wherein said incremental corrector comprises a counter that adds and subtracts incremental counts, wherein a signal generated by said second trigger determines whether said counter adds or subtracts.

29. The touch probe system of claim 21, wherein said touch element comprises a touch pin connected to a touch holder that is supported on a plurality of balls supported on a bottom of a housing.

30. The touch probe system of claim 29, further comprising a spring that engages said housing and said touch holder.

31. The touch probe system of claim 21, wherein said device for measuring a defined change in a measurable system parameter comprises an optical transmitter and a photo-element, wherein said touch element is disposed between said optical transmitter and said photo-element.

32. The touch probe system of claim 31, wherein said device for measuring a defined change in a measurable system parameter comprises a lens system disposed on said touch element.

* * * * *

UNITED STATES PATENT AND TRADEMARK OFFICE
CERTIFICATE OF CORRECTION

PATENT NO.   : 6,487,785 B1
DATED        : December 3, 2002
INVENTOR(S)  : Franz Ritz It is certified that error appears in the above-identified patent and that said Letters Patent is hereby corrected as shown below:

<u>Title page,</u>
Item [73], Assignee, delete "Johammes Heidenvain" and substitute
-- Johannes Heidenhain -- in its place.
Item [56], FOREIGN PATENT DOCUMENTS, delete "1/1999" and substitute
-- 1/1997 -- in its place.

Signed and Sealed this

Twenty-third Day of September, 2003

JAMES E. ROGAN
*Director of the United States Patent and Trademark Office*